United States Patent
Menon et al.

(10) Patent No.: US 12,218,839 B1
(45) Date of Patent: Feb. 4, 2025

(54) SERVICE FUNCTION CHAINING WITH SESSION-BASED ROUTING

(71) Applicant: Juniper Networks, Inc., Sunnyvale, CA (US)

(72) Inventors: Abilash Menon, Boxborough, MA (US); Scott Peter Inguagiato, Port Washington, NY (US); Anna Yungelson, Lexington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/240,714

(22) Filed: Aug. 31, 2023

Related U.S. Application Data

(63) Continuation of application No. 17/453,149, filed on Nov. 1, 2021, now abandoned.

(51) Int. Cl.
| | |
|---|---|
| *H04L 45/745* | (2022.01) |
| *H04L 12/46* | (2006.01) |
| *H04L 45/00* | (2022.01) |
| *H04L 45/42* | (2022.01) |
| *H04L 101/622* | (2022.01) |

(52) U.S. Cl.
CPC ........ *H04L 45/745* (2013.01); *H04L 12/4641* (2013.01); *H04L 45/38* (2013.01); *H04L 45/42* (2013.01); *H04L 2101/622* (2022.05)

(58) Field of Classification Search
CPC ... H04L 45/745; H04L 12/4641; H04L 45/38; H04L 45/42; H04L 2101/622
See application file for complete search history.

(56) References Cited

U.S. PATENT DOCUMENTS

| | | |
|---|---|---|
| 9,729,439 B2 | 8/2017 | MeLampy et al. |
| 9,729,682 B2 | 8/2017 | Kumar et al. |
| 9,762,485 B2 | 9/2017 | Kaplan et al. |

(Continued)

OTHER PUBLICATIONS

"Transmission Control Protocol," Darpa Internet Program Protocol Specification, Information Sciences Institute, RFC 793, Sep. 1981, 91 pp.

(Continued)

*Primary Examiner* — Oleg Survillo
*Assistant Examiner* — Monishwar Mohan
(74) *Attorney, Agent, or Firm* — SHUMAKER & SIEFFERT P. A.

(57) ABSTRACT

Techniques are disclosed for session-based load-balancing of network traffic to network service instances. In one example, a network device receives a first packet of a forward packet flow from a network service instance of a plurality of network service instances after application of a network service. The first packet specifies a Media Access Control (MAC) address of the network service instance as a source MAC address. The network device defines a session comprising the forward packet flow and a reverse packet flow and stores an association between the session and the MAC address of the network service instance. The network device determines that a second packet received from a destination device is associated with the reverse packet flow of the session. The network device forwards the second packet to the same network service instance based on the association between the session and the MAC address of the network service instance.

20 Claims, 6 Drawing Sheets

(56) References Cited

U.S. PATENT DOCUMENTS

| | | | |
|---|---|---|---|
| 9,871,748 B2 | 1/2018 | Gosselin et al. | |
| 9,985,883 B2 | 5/2018 | MeLampy et al. | |
| 10,200,264 B2 | 2/2019 | Menon et al. | |
| 10,277,506 B2 | 4/2019 | Timmons et al. | |
| 10,432,522 B2 | 10/2019 | Kaplan et al. | |
| 11,165,863 B1 | 11/2021 | Timmons et al. | |
| 2008/0075085 A1* | 3/2008 | Tsuge | H04L 12/2872 370/392 |
| 2015/0334045 A1* | 11/2015 | Tremblay | H04L 47/783 709/226 |
| 2016/0164780 A1* | 6/2016 | Timmons | H04L 45/70 370/238 |
| 2017/0250955 A1* | 8/2017 | Grant | H04L 63/20 |
| 2017/0339061 A1* | 11/2017 | MeLampy | H04L 47/2483 |
| 2017/0346709 A1 | 11/2017 | Menon et al. | |
| 2017/0373972 A1* | 12/2017 | Kaplan | H04L 61/2521 |
| 2018/0006935 A1 | 1/2018 | Mutnuru et al. | |
| 2018/0287905 A1* | 10/2018 | Mehta | H04L 47/2483 |
| 2020/0007506 A1 | 1/2020 | Dilley et al. | |
| 2020/0366589 A1 | 11/2020 | Kaplan et al. | |
| 2020/0366590 A1 | 11/2020 | Kaplan et al. | |
| 2020/0366598 A1 | 11/2020 | Kaplan et al. | |
| 2020/0366599 A1 | 11/2020 | Kaplan et al. | |
| 2020/0403890 A1 | 12/2020 | McCulley et al. | |

OTHER PUBLICATIONS

Postel, "User Datagram Protocol," RFC 768, Aug. 28, 1980, 3 pp.
Prosecution History from U.S. Appl. No. 17/453,149, dated Sep. 23, 2022 through Oct. 23, 2023, 167 pp.
U.S. Appl. No. 17/453,149, filed Nov. 1, 2021, by Menon et al.

\* cited by examiner

Network Interface: iboss-scg

Network Interface Settings

Rewrite DSCP
false  true

DSCP Map
Select

Ingress Source NAT Pool
Select

Allow ICMP
allow

Multicast Report Proxy
false  true

MTU
1500

Use Packet Source MAC for Reverse Traffic when ARP is Unresolved
false  true

Prefix Delegation
false  true

Prioritization Mode
local

Source NAT
false  true

Egress Source NAT Pool
Select

Multicast Listeners
automatic

QP Value
0

Enforced MSS
disabled

Use Packet Source MAC for Reverse Traffic for Off-Subnet Source IP
false  true

Revert  Validate  Commit

SERVICE FUNCTION CHAINING WITH SESSION-BASED ROUTING

This application is a continuation of U.S. patent application Ser. No. 17/453,149, filed Nov. 1, 2021, the entire contents of which is incorporated herein by reference.

TECHNICAL FIELD

This disclosure generally relates to computer networks, and, more specifically, routing packets within computer networks.

BACKGROUND

A computer network is a collection of interconnected computing devices that can exchange data and share resources. Example computing devices include routers, switches, and other Layer 2 (L2) network devices that operate within Layer 2 of the Open Systems Interconnection (OSI) reference model, i.e., the data link layer, and Layer 3 (L3) network devices that operate within Layer 3 of the OSI reference model, i.e., the network layer. Network devices within computer networks often include a control unit that provides control plane functionality for the network device and forwarding components for routing or switching data units.

The computing devices may establish a "network session" (also referred to herein as "session") to enable communication between devices on a computer network. A session may be bidirectional in that the session includes packets traveling in both directions between a first device and a second device. For example, a session includes a forward packet flow originating from a first device and destinated for a second device and a reverse packet flow originating from the second device and destined for the first device. The forward and reverse packet flows of the session are related to one another in that the source address and source port of the forward packet flow is the same as the destination address and destination port of the reverse packet flow, and the destination address and destination port of the forward packet flow is the same as the source address and source port of the reverse packet flow. To establish a session, computing devices may use one or more communication session protocols including Transmission Control Protocol (TCP), Transport Layer Security (TLS), User Datagram Protocol (UDP), Internet Control Message Protocol (ICMP), etc.

SUMMARY

Techniques are disclosed for session-based load-balancing of network traffic to network service instances to enable service-chaining within a session-based routing environment. A session between a source device and a destination device includes a forward packet flow and a reverse packet flow. The forward packet flow comprises a plurality of packets originating from the source device and destined for the destination device, while the reverse packet flow comprises a plurality of packets originating from the destination device and destined for the source device. In a session-based routing environment, a router forwards each packet of the plurality of packets of the forward packet flow along a same forward path and each packet of the plurality of packets of the reverse packet flow along a same reverse path (which may be the same as or different from the forward path). The use of session-based routing allows provides numerous benefits over conventional packet-based routing, such as reducing overhead by obviating the need for tunnels and encapsulation, simplifying traffic engineering, and enabling each router along the forward and reverse paths with which to apply stateful services to each packet of the session.

In a conventional service-chaining environment, a router receives a plurality of packets from a source device. The router applies a load-balancing operation on a per-packet basis to forward each packet to an available instance of a network service. Each network service instance applies a network service to a received packet and forwards the serviced packet to a same or different router for forwarding to a destination device of the packet. While the use of per-packet load-balancing may be easily implemented and may enable efficient use of a plurality of network service instances, it is not guaranteed that a conventional router will send each packet of a forward packet flow received from the source device to the same network service instance.

With respect to session-based routing, it may be desirable to forward all traffic associated with the forward and reverse packet flows of a session to the same network instance for load-balancing purposes and to allow application of stateful services, such as stateful firewall services, to the traffic of the session. If a router selects a particular network service instance of a plurality of network service instances for servicing a packet of a forward packet flow of a session, the router may be able to forward subsequent packets of the forward packet flow to the selected network service instance. However, the router that selects the network service instance and forwards packets of the forward packet flow to the selected network service instance may be a different router than the router that receives packets of the reverse packet flow to be forwarded to the selected network service instance. Because the network service instance may not modify Internet Protocol (IP) information (or other types of Layer 3 information) of the packet, a conventional router receiving a serviced packet from the network service instance may be unable to identify the network service instance, and therefore may be unable to forward a packet of a reverse packet flow of the session to the same network service instance. Furthermore, where the network service instances are not within a subnet of the router, a conventional router is unable to use an Address Resolution Protocol (ARP) request to obtain a MAC address of a network service instance so as to forward the packet to a particular network service instance. Therefore, a conventional router is unable to implement service chaining for session-based routing because such a router is unable to forward packets of the reverse packet flow of the session to the same network service instance that applied a network service to packets of the forward packet flow of the session.

In accordance with the techniques of the disclosure, a router receives a first packet of the forward packet flow from a source device. The router performs a load balancing operation to select a network service instance of a plurality of network service instances with which to apply a network service to the first packet. Additionally, the router defines a first session comprising the forward packet flow comprising the first packet and a reverse packet flow between the source device and the selected network service instance. The router forwards the first packet to the selected network service instance for application of the network service provided by the network service instance to the first packet. The network service instance applies the network service to the first packet and forwards the first packet to the router.

The router receives, from the network service instance, the first packet after application of the network service to the first packet. The first packet, as received from the network service instance, specifies a source Media Access Control (MAC) address that is a MAC address of the network service instance. The router defines a second session comprising a forward packet flow comprising the first packet and a reverse packet flow between the network service instance and a destination device to which the first packet is destined. The router stores an association between the second session and the MAC address of the network service instance and forwards the packet to the destination device.

Subsequently, the router receives a second packet from the destination device. The router determines that the second packet is associated with the reverse packet flow of the second session between the network service instance and the destination device. The router forwards, based on the stored association between the second session and the MAC address of the network service instance, the second packet to the selected network service instance of the plurality of network service instances for application of the network service provided by the network service instance to the second packet.

The network service instance applies the network service to the second packet and forwards the second packet to the router. The router determines that the second packet is associated with the reverse packet flow of the first session between the source device and the network service instance, and the router forwards the second packet to the source device.

The techniques of the disclosure may provide specific improvements to the computer-related field of computer networking that have practical applications. For example, the techniques of the disclosure may enable the use of service chaining in networks that perform session-based routing of network traffic. Therefore, a network implementing the techniques disclosed herein may benefit from both the advantages of session-based routing and from the implementation of service chaining. For example, such a network may benefit from improved scalability and decreased overhead, as well as from the application of multiple stateful services to network traffic on a session-specific basis.

In one example, this disclosure describes a method comprising: receiving, by a router, from a network service instance of a plurality of network service instances, and after application of a network service provided by the network service instance, a first packet of a forward packet flow, wherein the first packet specifies a Media Access Control (MAC) address of the network service instance as a source MAC address; defining, by the router, a session comprising the forward packet flow and a reverse packet flow; storing, by the router, an association between the session and the MAC address of the network service instance; forwarding, by the router and to a destination device, the first packet; receiving, by the router and from the destination device, a second packet; determining, by the router, that the second packet is associated with the reverse packet flow of the session; and forwarding, by the router, based on the association between the session and the MAC address of the network service instance, and for application of the network service provided by the network service instance, the second packet to the network service instance of the plurality of network service instances.

In another example, this disclosure describes a router comprising: a storage medium; and processing circuitry configured to: receive, from a network service instance of a plurality of network service instances, and after application of a network service provided by the network service instance, a first packet of a forward packet flow, wherein the first packet specifies a Media Access Control (MAC) address of the network service instance as a source MAC address; define a session comprising the forward packet flow and a reverse packet flow; store, in the storage medium, an association between the session and the MAC address of the network service instance; forward, to a destination device, the first packet; receive, from the destination device, a second packet; determine that the second packet is associated with the reverse packet flow of the session; and forward, based on the association between the session and the MAC address of the network service instance, and for application of the network service provided by the network service instance, the second packet to the network service instance of the plurality of network service instances.

In another example, this disclosure describes a non-transitory, computer-readable storage medium comprising instructions that, when executed, are configured to cause processing circuitry of a router to: receive, from a network service instance of a plurality of network service instances, and after application of a network service provided by the network service instance, a first packet of a forward packet flow, wherein the first packet specifies a Media Access Control (MAC) address of the network service instance as a source MAC address; define a session comprising the forward packet flow and a reverse packet flow; store, in a storage medium, an association between the session and the MAC address of the network service instance; forward, to a destination device, the first packet; receive, from the destination device, a second packet; determine that the second packet is associated with the reverse packet flow of the session; and forward, based on the association between the session and the MAC address of the network service instance, and for application of the network service provided by the network service instance, the second packet to the network service instance of the plurality of network service instances.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 5 is an illustration of an example user interface for a router operating in accordance with the techniques of the disclosure Like reference characters refer to like elements throughout the figures and description.

DETAILED DESCRIPTION

Figure 1:
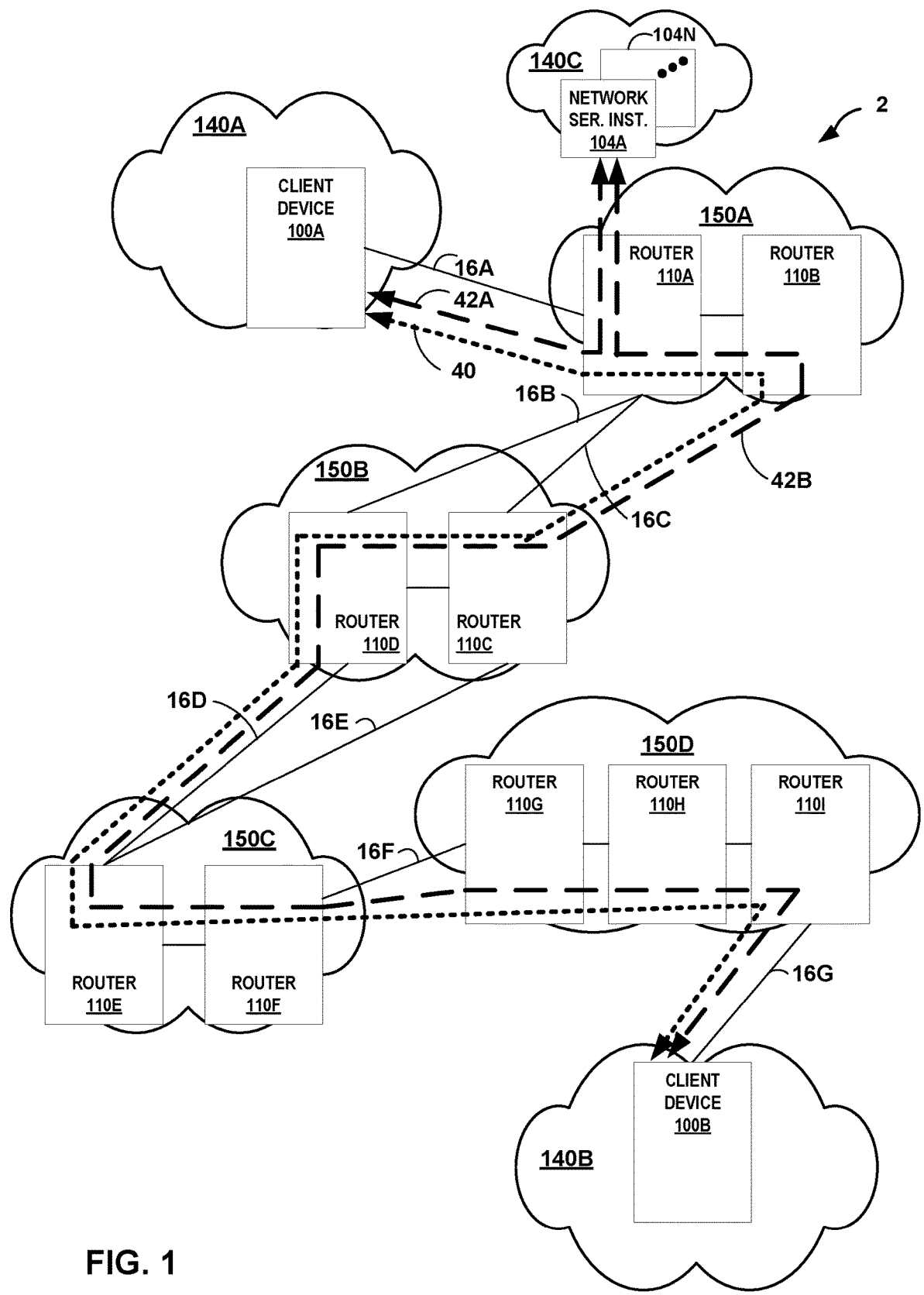
FIG. 1 is a block diagram illustrating an example computer network system in accordance with the techniques of the disclosure.

FIG. 1 is a block diagram illustrating an example computer network system 2 in accordance with the techniques of the disclosure. In the example of FIG. 1, computer network system 2 includes service provider networks 150A-150D (collectively, "service provider networks 150") configured to provide Wide Area Network (WAN) connectivity to disparate customer networks 140A-140B (collectively, "customer networks 140"). Routers 110A-110I (collectively, "routers 110") of service provider networks 150 provide client devices 100A-100B (collectively, "client devices 100") associated with customer networks 140 with access to service provider networks 150. While the example of FIG. 1 is described with respect to routers 110, in other examples, network devices of other types, such as switches, routers, gateways, or other suitable network devices that may send and receive network traffic, may perform the operations described herein with respect to routers 110.

In some examples, customer networks 140 are enterprise networks. Customer network 140A is depicted as having a single client device 100A and customer network 140B is depicted as having a single client device 100B for ease of illustration, but each of customer networks 140 may include any number of client devices. Typically, customer networks 140 include many client devices 100, each of which may communicate across service provider networks 150 with one another as described in more detail below. Communication links 16A-16G (collectively, links "16") may be Ethernet, ATM or any other suitable network connections.

Routers 110 are illustrated as routers in the example of FIG. 1. However, techniques of the disclosure may be implemented using any network device, such as switches, routers, gateways, or other suitable network devices that may send and receive network traffic. Customer networks 140 may be networks for geographically separated sites of an enterprise, for example. Each of customer networks 140 may include additional customer equipment, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers not depicted in FIG. 1. The configuration of computer network system 2 illustrated in FIG. 1 is merely an example. For example, computer network system 2 may include any number of customer networks 140. Nonetheless, for ease of description, only customer networks 140A-140B are illustrated in FIG. 1.

Service provider networks 150 represent one or more publicly accessible computer networks that are owned and operated by one or more service providers. Although computer network system 2 is illustrated in the example of FIG. 1 as including multiple interconnected service provider networks 150, in other examples computer network system 2 may alternatively include a single service provider network that provides connectivity between customer networks 140. A service provider is usually a large telecommunications entity or corporation. Each of service provider networks 150 is usually a large L3 computer network. Each service provider network 150 is an L3 network in the sense that it natively supports L3 operations as described in the OSI model. Common L3 operations include those performed in accordance with L3 protocols, such as the Internet Protocol (IP). L3 is also known as a "network layer" in the OSI model and the term L3 may be used interchangeably with the phrase "network layer" throughout this disclosure.

Although not illustrated, each service provider network 150 may be coupled to one or more networks administered by other providers, and may thus form part of a large-scale public network infrastructure, e.g., the Internet. Consequently, customer networks 140 may be viewed as edge networks of the Internet. Each service provider network 150 may provide computing devices within customer networks 140, such as client devices 100, with access to the Internet, and may allow the computing devices within customer networks 140 to communicate with each other.

Although additional routers are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers. Moreover, although the elements of system 2 are illustrated as being directly coupled, it should be understood that one or more additional network elements may be included along any of network links 16, such that the network elements of system 2 are not directly coupled.

Each service provider network 150 typically provides a number of residential and business services for customer networks 140, including residential and business class data services (which are often referred to as "Internet services" in that these data services permit access to the collection of publicly accessible networks referred to as the Internet), residential and business class telephone and/or voice services, and residential and business class television services.

In some examples, network service instances 104A-104N (collectively, "network service instances 104") may apply one or more network services to traffic of client devices 100. Each network service instance 104 may be, e.g., a virtualized network service instantiated by a virtual machine executed by processing circuitry of a server. In some examples, network service instances 104A are a plurality of firewall instances that provide stateful firewall services to traffic of client devices 100. In some examples, network service instances 104A are a plurality of deep packet inspection instances that provide deep packet inspection services to traffic of client devices 100.

Session-Based Routing

In some examples, routers 110 may implement a stateful, session-based routing scheme that enables each router 110 to independently perform path selection and traffic engineering. The use of session-based routing may enable routers 110 to eschew the use of a centralized controller, such as a Software-Defined Networking (SDN) controller to perform path selection and traffic engineering. In this way, routers 110 may be more efficient and scalable for large networks where the use of an SDN controller would be infeasible. Furthermore, the use of session-based routing may enable routers 110 to eschew the use of tunnels, thereby saving considerable network resources by obviating the need to perform encapsulation and decapsulation at tunnel endpoints. In some examples, routers 110 implement session-based routing as Secure Vector Routing (SVR), provided by Juniper Networks, Inc.

In the example of FIG. 1, client device 100A of system 2 establishes session 40 with client device 100B. Routers 110 facilitate establishment of session 40 by transporting network traffic between client device 100A and client device 100B. In some examples, client device 100A may be considered a "source" device and client device 100B may be considered a "destination device" in that client device 100A originates session 40 between client device 100A and client device 100B, e.g., client device 100A is the "source" of a packet of a forward packet flow of the session while client device 100B is the "destination" of the packet of the forward packet flow of the session. Client device 100A may be referred to as a "source device" and client device 100B may be referred to as a "destination device" through the disclosure. Session 40 includes a forward packet flow originating from client device 100A and destined for client device 100B and a reverse packet flow originating from client device 100B and destined for client device 100A. A forward packet flow for session 40 traverses a first path including, e.g., client device 100A, routers 110A-110I, and client device 100B. As described in more detail below, routers 110 enable the exchange of traffic between customer network 140A, across service provider networks 150, to customer network 140B.

Client device 100A (e.g., a source device) may establish session 40 with client device 100B (e.g., a destination device) according to one or more L2 or L3 communication session protocols, including Ethernet, TCP, or UDP. As described in more detail below, customer network 140A may form a first network and customer network 140B may form a second network. Routers 110 operate to extend customer network 140A across service provider networks 150 to customer network 140B. In this fashion, customer network 140A and customer network 140B may operate as if they were both part of the same network, even though customer network 140A and customer network 140B may be logically isolated and geographically separate from one another. Furthermore, routers 110 may operate such that the existence of service provider networks 150 between customer network 140A and customer network 140B is transparent to client devices 100.

In some examples, routers 110 may extend session 40 across service provider networks 150 according to one or more communication session protocols, including TCP or UDP, etc. For example, to establish session 40 according to TCP such that data may be exchanged according to TCP, router 110A and router 110B perform a three-way handshake. Router 110A sends a first packet comprising a "SYN" flag to router 110B. Router 110B acknowledges receipt of the first packet by responding to router 110A with a second packet comprising a "SYN-ACK" flag. Router 110A acknowledges receipt of the second packet by responding to router 110B with a third packet comprising an "ACK" flag. After sending the third packet, session 40 is established according to TCP and routers 110A, 110B may exchange data with one another (e.g., by exchanging data packets of client device 100A and client device 100B) via session 40. Additional example information regarding TCP is described in "TRANSMISSION CONTROL PROTOCOL," Request for Comments (RFC) 793, Internet Engineering Task Force (IETF), September 1981, available at https://tools.ietf.org/html/rfc793, the entire contents of which are incorporated herein by reference.

UDP is a connectionless protocol in that router 110A does not verify that router 110B is capable of receiving data prior to transmitting data. To establish session 40 according to UDP, router 110A transmits a first packet to router 110B. Session 40 may be considered "established" according to UDP upon receipt by router 110A of any packet from router 110B, which implies that router 110B successfully received the first packet from router 110A, responded, and router 110A was able to receive the response from router 110B. Additional example information regarding UDP is described in "User Datagram Protocol," RFC 768, IETF, Aug. 28, 1980, available at https://tools.ietf.org/html/rfc768, the entire contents of which are incorporated herein by reference.

In the example of FIG. 1, when router 110A receives a packet for the forward packet flow originating from client device 100A and destined for client device 100B, router 110A determines whether the packet belongs to a new session (e.g., is the "first" packet or "lead" packet of session 40). In some examples, router 110A determines whether a source address, source port, destination address, destination port, and protocol of the first packet matches an entry in a session table.

If no such entry exists, router 110A determines that the packet belongs to a new session and creates an entry in the session table. Furthermore, if the packet belongs to a new session, router 110A may generate a session identifier for session 40. The session identifier may comprise, e.g., a source address and source port of client device 100A, a destination address and destination port of client device 100B, and a protocol used by the first packet. Router 110A may use the session identifier to identify subsequent packets as belonging to the same session.

In some examples, routers 110 perform stateful routing for session 40. For example, routers 110 may forward each packet of the forward packet flow of session 40 sequentially and along the same forward network path. As described herein, the "same" forward path may mean the same routers 110 that form a segment or at least a portion between a device originating the packet and a device to which the packet is destined (and not necessarily the entire network path between the device originating the packet and the device to which the packet is destined). Further, routers 110 forward each packet of the return flow of session 40 sequentially and along the same return network path. The forward network path for the forward packet flow of session 40 and the return network path of the return packet flow of session 40 may be the same path, or different paths. By ensuring that each packet of a flow is forwarded sequentially and along the same path, routers 110 maintain the state of the entire flow at each router 110, thereby enabling the use of stateful packet services, such as Deep Packet Inspection (DPI) or stateful firewall services.

In the example of FIG. 1, a stateful routing session may be established from ingress router 110A through intermediate routers 110B-110H to egress router 110I. In this example, router 110A determines that the first packet is an unmodified packet and the first packet of new session 40. Router 110A modifies the first packet to include metadata specifying the session identifier (e.g., the original source address, source port, destination address, and destination port). Router 110A replaces the header of the modified first packet to specify a source address that is an address of router 110A, a source port that is a port via which router 110A forwards the modified first packet toward client device 100B, a destination address that is an address of the next hop to which router 110A forwards the first packet (e.g., an address of router 110B), and a destination port that is a port of the next hop to which router 110A forwards the first packet (e.g., a port of router 110B).

Router 110A may further identify a network service associated with session 40. For example, router 110A may compare one or more of a source address, source port, destination address, or destination port for the session to a table of service address and port information to identify a service associated with the session. Examples of network services include Hypertext Transfer Protocol (HTTP), a firewall service, a proxy service, packet monitoring or metrics services, etc. For example, router 110A may determine that the forward packet flow of session 40 specifies a destination address and destination port assigned to client device 100B. Router 110A may thereafter store an association between session 40 with the identified network service.

As another example, if the source port and/or destination port for session 40 is 80, router 110A may determine that session 40 is associated with an HTTP service. In other examples, router 110A may determine that one or more of a source address, source port, destination address, or destination port for session 40 belong to a block of address or ports indicative that a particular service is associated with session 40.

In some examples, router 110A uses the determined network service for session 40 to select a forward path for forwarding the first packet and each subsequent packet of the forward packet flow of session 40 toward client device 100B. In this fashion, router 110A may perform service-specific path selection to select a network path that best suits the requirements of the service. In contrast to a network topology that uses an SDN controller to perform path selection, each router 110 performs path selection. Further, the use of session-based routing enables each router 110 to make routing decisions at the service- or application-level, in contrast to conventional routers that are only able to make routing decisions at the flow level.

Router 110A forwards the modified first packet to router 110B. Additionally, router 110A stores the session identifier for session 40 such that, upon receiving subsequent packets for session 40, router 110A may identify the subsequent packets as belonging to the same session 40 and forward the subsequent packets along the same path as the first packet.

Intermediate router 110B receives the modified first packet and determines whether the modified first packet includes metadata specifying the session identifier. In response to determining that the modified first packet includes metadata specifying the session identifier, intermediate router 110B determines that router 110B is not an ingress device such that router 110B does not attach metadata specifying the session identifier.

As described above with respect to router 110A, router 110B determines whether the packet belongs to a new session (e.g., is the "first" packet or "lead" packet of the session) by determining whether a source address, source port, destination address, destination port, and protocol of the first packet matches an entry in a session table. If no such entry exists, router 110B determines that the packet belongs to a new session and creates an entry in the session table. Furthermore, if the packet belongs to a new session, router 110B generates a session identifier for the session. The session identifier used by router 110B to identify the session for the first packet may be different from the session identifier used by router 110A to identify the same session for the first packet, because each router 110A, 110B uses the header source address, source port, destination address, and destination port of the first packet to generate the session identifier, and this header information may be modified by each preceding router 110 as each router 110 forwards the first packet along the forward path. Furthermore, each router 110 may store this header information to identify a previous router 110 (or "waypoint") and a next router 110 (or "waypoint") such that each router 110 may reconstruct the same forward path and reverse path for each subsequent packet of the session.

Router 110B replaces the header of the modified first packet to specify a source address that is an address of router 110B, a source port that is a port via which router 110B forwards the modified first packet toward client device 100B, a destination address that is an address of the next hop to which router 110B forwards the first packet (e.g., an address of router 110C for session 40 along the first path), and a destination port that is a port of the next hop to which router 110B forwards the first packet (e.g., a port of router 110C). Router 110B forwards the modified first packet to router 110C. Additionally, router 110B stores the session identifier for the session such that, upon receiving subsequent packets for the session, router 110B may identify subsequent packets as belonging to the same session and forward the subsequent packets along the same path as the first packet.

Subsequent intermediate routers 110C-110H process the modified first packet in a similar fashion as routers 110A and 110B such that routers 110 forward the subsequent packets of the session along the same path as the first packet. Further, each router 110 stores a session identifier for the session, which may include an identification of the previous router 110 along the network path. Thus, each router 110 may use the session identifier to forward packets of the reverse packet flow for the session along the same network path back to client device 100.

A router 110 that may forward packets for a forward packet flow of the session to a destination for the packet flow is an egress, or "terminus" router. In the foregoing example, router 110I is a terminus router because router 110I may forward packets to client device 100B. Router 110I receives the modified first packet that comprises the metadata specifying the session identifier (e.g., the original source address, source port, destination address, and destination port). Router 110I identifies the modified first packet as destined for a service terminating at router 110I by determining that the destination source address and destination source port specified in the metadata of the modified lead packet corresponds to a destination reachable by router 110I (e.g., client device 100B). Router 110I recovers the original first packet by removing the metadata from the modified first packet and using the metadata to modify the header of the first packet to specify the original source address, source port, destination address, and destination port. Router 110I forwards the recovered first packet to client device 100B. The use of session-based routing may therefore form a series of waypoints (e.g., routers 110) interconnected by path "segments" (e.g., end-to-end route vectors between each waypoint).

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

Exchanging Service and Topology State Information

In some examples, to implement session-based routing, each router 110 maintains a local repository of service and topology state information for each other router 110. The service and topology state information includes services reachable from each router 110, as well as a network topology from each router for reaching these services. Each router 110 may transmit changes in the services reachable from the router 110 and/or changes in the network topology for reaching the services from the router to a central repository, e.g., a server. Further, each router 110 may receive service and topology state information for each other router 110 in system 2 from the central repository.

In the foregoing example, router 110A receives a packet, determines session 40 for the forward packet flow comprising the packet, determines a service associated with session 40, and selects a network path for forwarding the packet. Router 110A may use its local copy of the service and topology state information for each router 110 to select the network path for forwarding the packet. For example, router 110A may use the identified service associated with the packet and a network topology for reaching the identified service to select a network path that comports with an SLA requirement or other session performance requirements for the service. Router 110A may then forward the packet and subsequent packets for the forward packet flow of session 40 along the selected path. In this fashion, router 110A may perform service-specific path selection in that router 110 may use criteria specific to the service associated with the packet to select a network path that best suits the requirements of the service.

In some examples, interfaces of routers 110 may be assigned to one or more "neighborhoods." A "neighborhood" is defined as a label applied to an interface of a router 110. The routers 110 within the same neighborhood are capable of forming a peering relationship with one another. For example, each router 110 having an interface to which a neighborhood label is applied is reachable over a Layer-3 network to each other router 110 having an interface to which the same neighborhood label is applied. In some examples, one or more neighborhoods may be aggregated into a "district." A district is a logical grouping of one or more neighborhoods. Typically, an Autonomous System (AS) (also referred to herein as an "Authority") may be divided into one or more districts, each district including one or more neighborhoods.

In some examples, each router 110 maintains a local repository of service and topology state information only for those other routers 110 within the same neighborhood. In some examples, each router 110 maintains a local repository of service and topology state information only for those other routers 110 within the same district of neighborhoods. As an example, each service provider network 150 may be considered to be a different "district," wherein each subdomain within each service provider network 150 may be considered to be a neighborhood within that district. In this example, each router 110A and 110B within service provider network 150A may maintain service and topology state information only for one another, and not for routers 110C-110I. Similarly, each router 110D and 110C within service provider network 150B may maintain service and topology state information only for one another, and not for routers 110A-110B or 110E-110I. In other examples, an administrator may assign one or more service provider networks 150 into one or more districts, one or more neighborhoods, or a combination of districts and neighborhoods as suits the needs of network system 2.

Additional information with respect to the exchange of service and topology state information is described in U.S. Patent Application Publication No. 2020/0366590, entitled "CENTRAL AUTHORITY FOR SERVICE AND TOPOLOGY EXCHANGE," published on Nov. 19, 2020; U.S. Patent Application Publication No. 2020/0366599, entitled "SOURCE-BASED ROUTING," published on Nov. 19, 2020; U.S. Patent Application Publication No. 2020/0366598, entitled "SERVICE AND TOPOLOGY EXCHANGE PROTOCOL," published on Nov. 19, 2020; U.S. Patent Application Publication No. 2020/0366589, entitled "ROUTING USING SEGMENT-BASED METRICS," published on Nov. 19, 2020; and U.S. patent application Ser. No. 16/050,722, entitled "NETWORK NEIGHBORHOODS FOR ESTABLISHING COMMUNICATION RELATIONSHIPS BETWEEN COMMUNICATION INTERFACES IN AN ADMINISTRATIVE DOMAIN," filed on Jul. 31, 2018, the entire content of each of which is incorporated herein by reference in its entirety.

Service Function Chaining with Session-Based Routing

In a conventional service-chaining environment, a router receives a plurality of packets from a source device. The router applies a load-balancing operation on a per-packet basis to forward each packet to an available instance of a network service. Each network service instance applies a network service to a received packet and forwards the serviced packet to a same or different router for forwarding to a destination device of the packet. While the use of per-packet load-balancing may be easily implemented and may enable efficient use of a plurality of network service instances, it is not guaranteed that a conventional router will send each packet of a forward packet flow received from the source device to the same network service instance.

With respect to session-based routing, it may be desirable to forward all traffic associated with the forward and reverse packet flows of a session to the same network instance for load-balancing purposes and to allow application of stateful services, such as stateful firewall services, to the traffic of the session. If a router selects a particular network service instance of a plurality of network service instances for servicing a packet of a forward packet flow of a session, the router may be able to forward subsequent packets of the forward packet flow to the selected network service instance. However, the router that selects the network service instance and forwards packets of the forward packet flow to the selected network service instance may be a different router than the router that receives packets of the reverse packet flow to be forwarded to the selected network service instance. Because the network service instance may not modify Internet Protocol (IP) information (or other types of Layer 3 information) of the packet, a conventional router receiving a serviced packet from the network service instance may be unable to identify the network service instance, and therefore may be unable to forward a packet of a reverse packet flow of the session to the same network service instance. Furthermore, where the network service instances are not within a subnet of the router, a conventional router is unable to use an ARP request to obtain a MAC address of a network service instance so as to forward the packet to a particular network service instance. Therefore, a conventional router is unable to implement service chaining for session-based routing because such a router is unable to forward packets of the reverse packet flow of the session to the same network service instance that applied a network service to packets of the forward packet flow of the session.

In accordance with the techniques of the disclosure, router 110A of computer network system 2 performs session-based load-balancing of network traffic to network service instances 104A-104N (collectively, "network service instances 104") to enable service-chaining within a session-based routing environment of computer network system 2. As described above, in some examples a router performing session-based routing may model the flow of traffic between client devices 100A, 100B as a single session 40 comprising a forward packet flow originating from client device 100A and destined for client device 100B and a reverse packet flow originating from client device 100B and destined for client device 100A. With respect to the example of FIG. 1, in contrast to this approach, to assist the implementation of service chaining, router 110A models the flow of traffic between client devices 100A, 100B as two sessions: session 42A comprising a forward packet flow and reverse packet flow between client device 100A and network service instance 104A, and session 42B comprising a forward packet flow and reverse packet flow between network service instance 104A and client device 100B.

As depicted in the example of FIG. 1, router 110A receives a first packet of a forward packet flow from client device 100A (e.g., a source device). Router 110A performs a load balancing operation to select network service instance 104A of a plurality of network service instances 104 with which to apply a network service to the first packet. Additionally, router 110A defines first session 42A comprising the forward packet flow comprising the first packet and a reverse packet flow between client device 100A and selected network service instance 104A. Router 110A forwards the first packet to selected network service instance 104A for application of the network service to the first packet. Network service instance 104A applies the network service to the first packet and forwards the first packet back to the router 110A.

Router 110A receives, from network service instance 104A, the first packet after application of the network service to the first packet. The first packet, as received from network service instance 104A, specifies a source Media Access Control (MAC) address that is a MAC address of network service instance 104A. Router 110A defines second session 42B comprising a forward packet flow comprising the first packet and a reverse packet flow between network service instance 104A and client device 100B (e.g., a destination device) to which the first packet is destined. Router 110A stores an association between second session 42B and the MAC address of network service instance 104A and forwards the packet to client device 100B.

Subsequently, router 110A receives a second packet from client device 100B. Router 110A determines that the second packet is associated with the reverse packet flow of second session 42B between network service instance 104A and client device 100B. Router 110A forwards, based on the stored association between second session 42B and the MAC address of network service instance 104A, the second packet to network service instance 104A and not other network service instances 104 such that the same network service instance 104A may apply the network service to the second packet.

Network service instance 104A applies the network service to the second packet and forwards the second packet to router 110A. Router 110A determines that the second packet is associated with the reverse packet flow of first session 42A between client device 100A and network service instance 104A, and router 110A forwards the second packet to client device 100B.

Accordingly, as described above, router 110A may learn a MAC address of network service instance 104A from a first packet of a forward packet flow serviced by network service instance 104A, and store an association between the MAC address of network service instance 104A and session 42B. Upon receiving a second packet, router 110A may determine that the second packet belongs to a reverse packet flow of the same session 42B. in response to determining that the second packet belongs to session 42B, router 110A may use the stored association between the MAC address of network service instance 104A and session 42B to forward the second packet of the reverse packet flow to network service instance 104A for servicing. In this fashion, routers 110A may implement service chaining while performing session-based routing.

Figure 2:
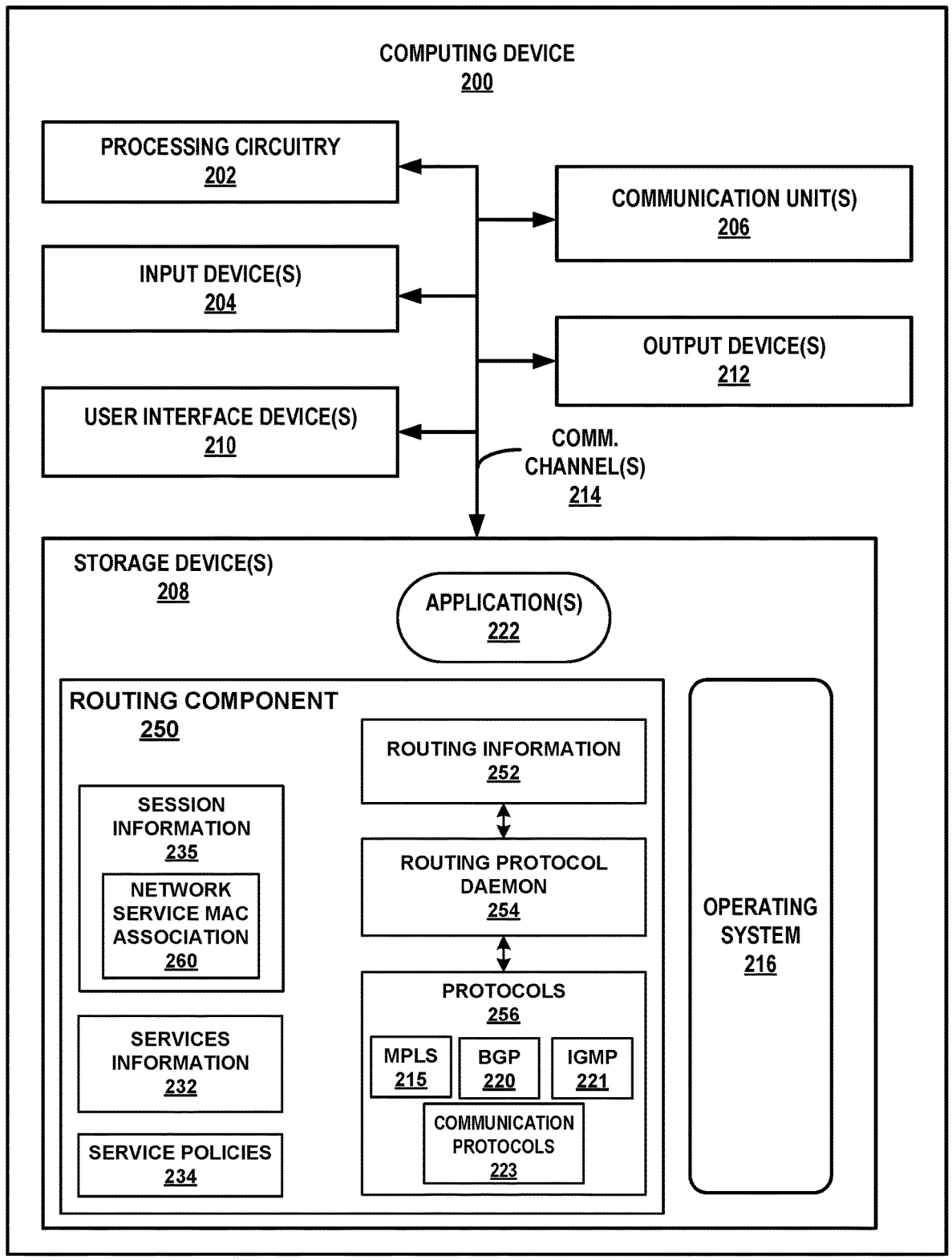
FIG. 2 is a block diagram illustrating an example computing device in accordance with the techniques of the disclosure.

FIG. 2 is a block diagram illustrating an example computing device 200 in accordance with the techniques of the disclosure. In general, computing device 200 may be an example implementation of one of routers 110 of FIG. 1. FIG. 2 illustrates a particular example of a server or other computing device 200 that includes processing circuitry 202 for executing any one or more of applications 222, routing component 250, or any other computing device described herein. Other examples of computing device 200 may be used in other instances.

Although shown in FIG. 2 as a stand-alone computing device 200 for purposes of example, a computing device that operates in accordance with the techniques of this disclosure may be any component or system that includes one or more processors or other suitable computing environment for executing software instructions and, for example, need not necessarily include one or more elements shown in FIG. 2 (e.g., communication units 206; and in some examples, components such as storage device(s) 208 may not be co-located or in the same chassis as other components). In some examples, computing device 200 may be implemented as a virtualized network function (VNF). In some examples, one or more aspects of computing device 200 can be run as one or more containers or as one or more applications within virtual machines of a Network Functions Virtualization (NFV) platform using, e.g., VirtIO and SRIOV network virtualization technologies, or on bare-metal servers. In some examples, computing device 200 is a physical network device, such as a switch, router, gateway, or other device that sends and receives network traffic.

As shown in the example of FIG. 2, computing device 200 includes processing circuitry 202, one or more input devices 204, one or more communication units 206, one or more output devices 212, one or more storage devices 208, and one or more user interface (UI) device(s) 210. Computing device 200, in one example, further includes one or more application(s) 222 and operating system 216 that are executable by computing device 200. Each of components 202, 204, 206, 208, 210, and 212 are coupled (physically, communicatively, and/or operatively) for inter-component communications. In some examples, communication channels 214 may include a system bus, a network connection, an inter-process communication data structure, or any other method for communicating data. As one example, components 202, 204, 206, 208, 210, and 212 may be coupled by one or more communication channels 214.

Processing circuitry 202, in one example, are configured to implement functionality and/or process instructions for execution within computing device 200. In some examples, processing circuitry 202 comprises one or more hardware-based processors. For example, processing circuitry 202 may be capable of processing instructions stored in storage device 208. Examples of processing circuitry 202 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 208 may be configured to store information within computing device 200 during operation. Storage device 208, in some examples, is described as a computer-readable storage medium. In some examples, storage device 208 is a temporary memory, meaning that a primary purpose of storage device 208 is not long-term storage. Storage device 208, in some examples, is described as a volatile memory, meaning that storage device 208 does not maintain stored contents when the computer is turned off. Examples of volatile memories include random access memories (RAM), dynamic random access memories (DRAM), static random access memories (SRAM), and other forms of volatile memories. In some examples, storage device 208 is used to store program instructions for execution by processing circuitry 202. Storage device 208, in one example, is used by software or applications running on computing device 200 to temporarily store information during program execution.

Storage devices 208, in some examples, also include one or more computer-readable storage media. Storage devices 208 may be configured to store larger amounts of information than volatile memory. Storage devices 208 may further be configured for long-term storage of information. In some examples, storage devices 208 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 200, in some examples, also includes one or more communication units 206. Computing device 200, in one example, utilizes communication units 206 to communicate with external devices via one or more networks, such as one or more wired/wireless/mobile networks. Communication units 206 may include a network interface, such as an Ethernet card, an optical transceiver, a radio frequency transceiver, or any other type of device that can send and receive information. Other examples of such network interfaces may include 3G and WiFi radios. In some examples, communication units 206 my include a plurality of high-speed network interface cards. In some examples, computing device 200 uses communication unit 206 to communicate with an external device. For example, computing device 200 uses communication unit 206 to communicate with other routers 110 and/or client devices 100 of FIG. 1 via links 16 of FIG. 1 with which communication unit 206 is connected.

Computing device 200, in one example, also includes one or more user interface devices 210. User interface devices 210, in some examples, are configured to receive input from a user through tactile, audio, or video feedback. Examples of user interface devices(s) 210 include a presence-sensitive display, a mouse, a keyboard, a voice responsive system, video camera, microphone or any other type of device for detecting a command from a user. In some examples, a presence-sensitive display includes a touch-sensitive screen. In some examples, a user such as an administrator of service provider networks 150 may enter configuration data for computing device 200.

One or more output devices 212 may also be included in computing device 200. Output device 212, in some examples, is configured to provide output to a user using tactile, audio, or video stimuli. Output device 212, in one example, includes a presence-sensitive display, a sound card, a video graphics adapter card, or any other type of device for converting a signal into an appropriate form understandable to humans or machines. Additional examples of output device 212 include a speaker, a cathode ray tube (CRT) monitor, a liquid crystal display (LCD), or any other type of device that can generate intelligible output to a user.

Computing device 200 may include operating system 216. Operating system 216, in some examples, controls the operation of components of computing device 200. For example, operating system 216, in one example, facilitates the communication of one or more applications 222 with processing circuitry 202, communication unit 206, storage device 208, input device 204, user interface devices 210, and output device 212. Applications 222 may also include program instructions and/or data that are executable by computing device 200.

In some examples, processing circuitry 202 executes routing component 250, which determines routes of received packets and forwards the packets accordingly. Routing component 250 communicates with other routers, e.g., such as routers 110 of FIG. 1, to establish and maintain a computer network, such as computer network system 2 of FIG. 1, for transporting network traffic between one or more customer devices. Routing protocol daemon (RPD) 254 of routing component 250 executes software instructions to implement one or more control plane networking protocols 256. For example, protocols 256 may include one or more routing protocols, such as Internet Group Management Protocol (IGMP) 221 and/or Border Gateway Protocol (BGP) 220, for exchanging routing information with other routing devices and for updating routing information base (RIB) 252, Multiprotocol Label Switching (MPLS) protocol 215, and other routing protocols. Protocols 256 may further include one or more communication session protocols, such as TCP, UDP, TLS, or ICMP.

Routing information 252 may describe a topology of the computer network in which computing device 200 resides, and may also include routes through the shared trees in the computer network. Routing information 252 describes various routes within the computer network, and the appropriate next hops for each route, i.e., the neighboring routing devices along each of the routes. Routing information 252 may be a radix tree programmed into dedicated forwarding chips, a series of tables, a complex database, a link list, a radix tree, a database, a flat file, or various other data structures.

Session information 235 stores information for identifying sessions. In some examples, session information 235 is in the form of a session table. For example, services information 232 comprises one or more entries that specify a session identifier. In some examples, the session identifier comprises one or more of a source address, source port, destination address, destination port, or protocol associated with a forward packet flow and/or a reverse packet flow of the session. As described above, when routing component 250 receives a packet for a forward packet flow originating from client device 100A and destined for client device 100B of FIG. 1, routing component 250 determines whether the packet belongs to a new session (e.g., is the "first" packet or "lead" packet of session 40). To determine whether the packet belongs to a new session, routing component 250 determines whether session information 235 includes an entry corresponding to a source address, source port, destination address, destination port, and protocol of the first packet. If an entry exists, then the session is not a new session. If no entry exists, then the session is new and routing component 250 generates a session identifier for the session and stores the session identifier in session information 235. Routing component 250 may thereafter use the session identifier stored in session information 235 for the session to identify subsequent packets as belonging to the same session.

Services information 232 stores information that routing component 250 may use to identify a service associated with a session. In some examples, services information 232 is in the form of a services table. For example, services information 232 comprises one or more entries that specify a service identifier and one or more of a source address, source port, destination address, destination port, or protocol associated the service. In some examples, routing component 250 may query services information 232 with one or more of a source address, source port, destination address, destination port, or protocol of a session for a received packet to determine a service associated with a session. For example, routing component 250 may determine a service identifier based on a correspondence of a source address, source port, destination address, destination port, or protocol in services information 232 to a source address, source port, destination address, destination port, or protocol specified by a session identifier. Routing component 250 retrieves, based on the service associated with the packet, one or more service policies 234 corresponding to the identified service. The service policies may include, e.g., a path failover policy, a Dynamic Host Configuration Protocol (DHCP) marking policy, a traffic engineering policy, a priority for network traffic associated with the session, etc. Routing component 250 applies, to the packet, the one or more service policies 234 that correspond to the service associated with the packet.

In accordance with the techniques of the disclosure, computing device 200 performs service function chaining with session-based routing. computing device 200 may operate as any of routers 110 of FIG. 1. In the example of FIG. 2, routing component 250 of computing device 200 performs session-based load-balancing of network traffic to network service instances 104A-104N (collectively, "network service instances 104") to enable service-chaining within a session-based routing environment of computer network system 2 of FIG. 1. In the following example, computing device 200 is described as operating as router 110A of FIG. 1.

As depicted in the example of FIG. 1, routing component 250 receives a first packet of a forward packet flow from client device 100A of FIG. 1 (e.g., a source device) via communication units 206. In some examples, the first packet specifies a Layer-2 header comprising a source MAC address that is a MAC address of client device 100A and a destination MAC address that is a MAC address of computing device 200. The first packet further specifies a Layer-3 header comprising a source IP address and a source port that are an IP address and a port of client device 100A, respectively, and a destination IP address and a destination port that are an IP address and a port of client device 100B, respectively. Routing component 250 performs a load balancing operation to select network service instance 104A of a plurality of network service instances 104 of FIG. 1 with which to apply a network service to the first packet. For example, routing component 250 may select network service instance 104A using a round-robin selection method or a least-utilization selection method, etc.

Routing component 250 defines, in session information 235, first session 42A comprising the forward packet flow comprising the first packet and a reverse packet flow between client device 100A and selected network service instance 104A. In some examples, routing component 250 defines, for first session 42A, a first session entry in session information 235 comprising a first session identifier, a first forward packet flow key for the forward packet flow between client device 100A and selected network service instance 104A, and a first reverse packet flow key for the reverse packet flow between client device 100A and selected network service instance 104A. In some examples, the first forward packet flow key comprises a 7-tuple of a header of the first packet received from client device 100A. The 7-tuple comprises, for example, a source IP address of the first packet (e.g., an IP address of client device 100A), a source port (e.g., a port of client device 100A), a destination IP address (e.g., an IP address of client device 100B), a destination port (e.g., a port of client device 100B), a network protocol used by the first packet (e.g., such as TCP or UDP), an interface identifier of an interface from which routing component 250 receives the first packet (e.g., an interface of client device 100A), and a Virtual Local Area Network (VLAN) identifier of the first packet (e.g., a VLAN to which client device 100A is assigned). In some examples, the first session identifier is the same as the first forward packet flow key.

In some examples, routing component 250 defines the first reverse packet flow key as the inverse of the first forward packet flow key. For example, routing component 250 defines the first reverse packet flow key based on a reverse packet flow to be received from client device 100B. The first reverse packet flow key comprises a 7-tuple comprising, for example, a source IP address (e.g., an IP address of client device 100B), a source port (e.g., a port of client device 100B), a destination IP address (e.g., an IP address of client device 100A), a destination port (e.g., a port of client device 100A), a network protocol (e.g., such as TCP or UDP), an interface identifier of an interface from which routing component 250 is to receive packets of the reverse packet flow (e.g., an interface of network service instance 104A), and a VLAN identifier (e.g., a VLAN to which client device 100B is assigned).

RPD 254 of routing component 250 forwards the first packet to network service instance 104A for application of the network service to the first packet. For example, RPD 254 modifies the Layer-2 header of the first packet to specify a source MAC address that is the MAC address of computing device 200 and a destination MAC address that is a MAC address of network service instance 104A, and forwards the first packet to network service instance 104A via communication units 206. Network service instance 104A applies the network service to the first packet and forwards the first packet back to computing device 200.

Routing component 250 receives, from network service instance 104A and via communication units 206, the first packet after application of the network service to the first packet. The Layer-2 header of the first packet, as received from network service instance 104A, specifies a source MAC address that is the MAC address of network service instance 104A and a destination MAC address that is the MAC address of computing device 200. Typically, the Layer-3 header of the first packet remains unchanged, e.g., the Layer-3 header comprises the source IP address and the source port that are the IP address and the port of client device 100A, respectively, and the destination IP address and the destination port that are the IP address and the port of client device 100B, respectively.

Routing component 250 defines, in session information 235, second session 42B comprising a forward packet flow comprising the first packet and a reverse packet flow between network service instance 104A and client device 100B (e.g., a destination device) to which the first packet is destined. In some examples, routing component 250 defines, for second session 42B, a second session entry in session information 235 comprising a second session identifier, a second forward packet flow key for the forward packet flow between network service instance 104A and client device 100B, and a second reverse packet flow key for the reverse packet flow between network service instance 104A and client device 100B. In some examples, the second forward packet flow key comprises a 7-tuple of a header of the first packet received from network service instance 104A. The 7-tuple comprises, for example, a source IP address of the first packet (e.g., an IP address of client device 100A), a source port (e.g., a port of client device 100A), a destination IP address (e.g., an IP address of client device 100B), a destination port (e.g., a port of client device 100B), a network protocol used by the first packet (e.g., such as TCP or UDP), an interface identifier of an interface from which routing component 250 receives the first packet (e.g., an interface of network service instance 104A), and a Virtual Local Area Network (VLAN) identifier of the first packet (e.g., a VLAN to which client device 100A is assigned). In some examples, the second session identifier is the same as the second forward packet flow key.

In some examples, routing component 250 defines the second reverse packet flow key as the inverse of the second forward packet flow key. For example, routing component 250 defines the second reverse packet flow key based on a reverse packet flow to be received from client device 100B. The second reverse packet flow key comprises a 7-tuple comprising, for example, a source IP address (e.g., an IP address of client device 100B), a source port (e.g., a port of client device 100B), a destination IP address (e.g., an IP address of client device 100A), a destination port (e.g., a port of client device 100A), a network protocol (e.g., such as TCP or UDP), an interface identifier of an interface from which routing component 250 is to receive packets of the reverse packet flow (e.g., an interface of client device 100B), and a VLAN identifier (e.g., a VLAN to which client device 100B is assigned).

Notably, the first forward packet flow key and first session identifier differ from the second forward packet flow key and second session identifier primarily in that the first forward packet flow key and first session identifier include the interface identifier of the interface of client device 100A, while the second forward packet flow key and second session identifier include the interface identifier of the interface of network service instance 104A. Additionally, the first reverse packet flow key differs from the second reverse packet flow key primarily in that the first reverse packet flow includes the interface identifier of the interface of network service instance 104A, while the second reverse packet flow key includes the interface identifier of the interface of client device 100B.

Additionally, routing component 250 stores an association 260 between second session 42B and the MAC address of network service instance 104A. For example, routing component 250 obtains, from the Layer-2 header of the first packet received from network service instance 104A after application of the network service to the first packet, the MAC address of network service instance 104A. Routing component 250 includes, in the second session entry for second session 42B in session information 235, the MAC address of network service instance 104A. RPD 254 of routing component 250 forwards the first packet to client device 100B via communication units 206.

Subsequently, routing component 250 receives, via communication units 206, a second packet from client device 100B. In some examples, the second packet specifies Layer-2 header comprising a source MAC address that is a MAC address of client device 100B and a destination MAC address that is a MAC address of computing device 200. The second packet further specifies a Layer-3 header comprising a source IP address and a source port that are an IP address and a port of client device 100B, respectively, and a destination IP address and a destination port that are an IP address and a port of client device 100A, respectively. The second packet may additionally specify an interface identifier for an interface of client device 100B from which computing device 200 receives the second packet.

Routing component 250 determines, based on a correspondence between the Layer-3 header of the second packet and the second session entry for second session 42B in session information 235, that the second packet is associated with the reverse packet flow of second session 42B between network service instance 104A and client device 100B. Based on the stored association between second session 42B and the MAC address of network service instance 104A, RPD 254 of routing component 250 forwards the second packet to network service instance 104A for application of the network service to the second packet. For example, RPD 254 modifies the Layer-2 header of the second packet to specify a source MAC address that is the MAC address of computing device 200 and a destination MAC address that is the MAC address of network service instance 104A, and forwards the second packet to network service instance 104A via communication units 106. Network service instance 104A applies the network service to the second packet and forwards the second packet back to computing device 200. In this fashion, routing component 250 enables computing device 100 to forward packets of the reverse packet flow from client device 100B to the same network service instance (e.g., network service instance 104A) for application of the network service as the network service instance which serviced packets of the forward packet flow from client device 100A, and not to other network service instances.

Routing component 250 receives, from network service instance 104A and via communication units 206, the second packet after application of the network service to the second packet. The Layer-2 header of the second packet, as received from network service instance 104A, specifies a source MAC address that is the MAC address of network service instance 104A and a destination MAC address that is the MAC address of computing device 200. Typically, the Layer-3 header of the second packet remains unchanged, e.g., the Layer-3 header comprises the source IP address and the source port that are the IP address and the port of client device 100B, respectively, and the destination IP address and the destination port that are the IP address and the port of client device 100A, respectively. The second packet may additionally specify an interface identifier for an interface of network service instance 104A from which computing device 200 receives the second packet.

Routing component 250 determines, based on a correspondence between the Layer-3 header of the second packet and the first session entry for first session 42A in session information 235, that the second packet is associated with the reverse packet flow of first session 42A between client device 100A and network service instance 104A. Based on the determination that the second packet is associated with the reverse packet flow of first session 42A, RPD 254 of routing component 250 forwards the second packet to client device 100A. For example, RPD 254 modifies the Layer-2 header of the second packet to specify a source MAC address that is the MAC address of computing device 200 and a destination MAC address that is the MAC address of client 100A, and forwards the second packet to client 100A via communication units 106.

Figure 3A:
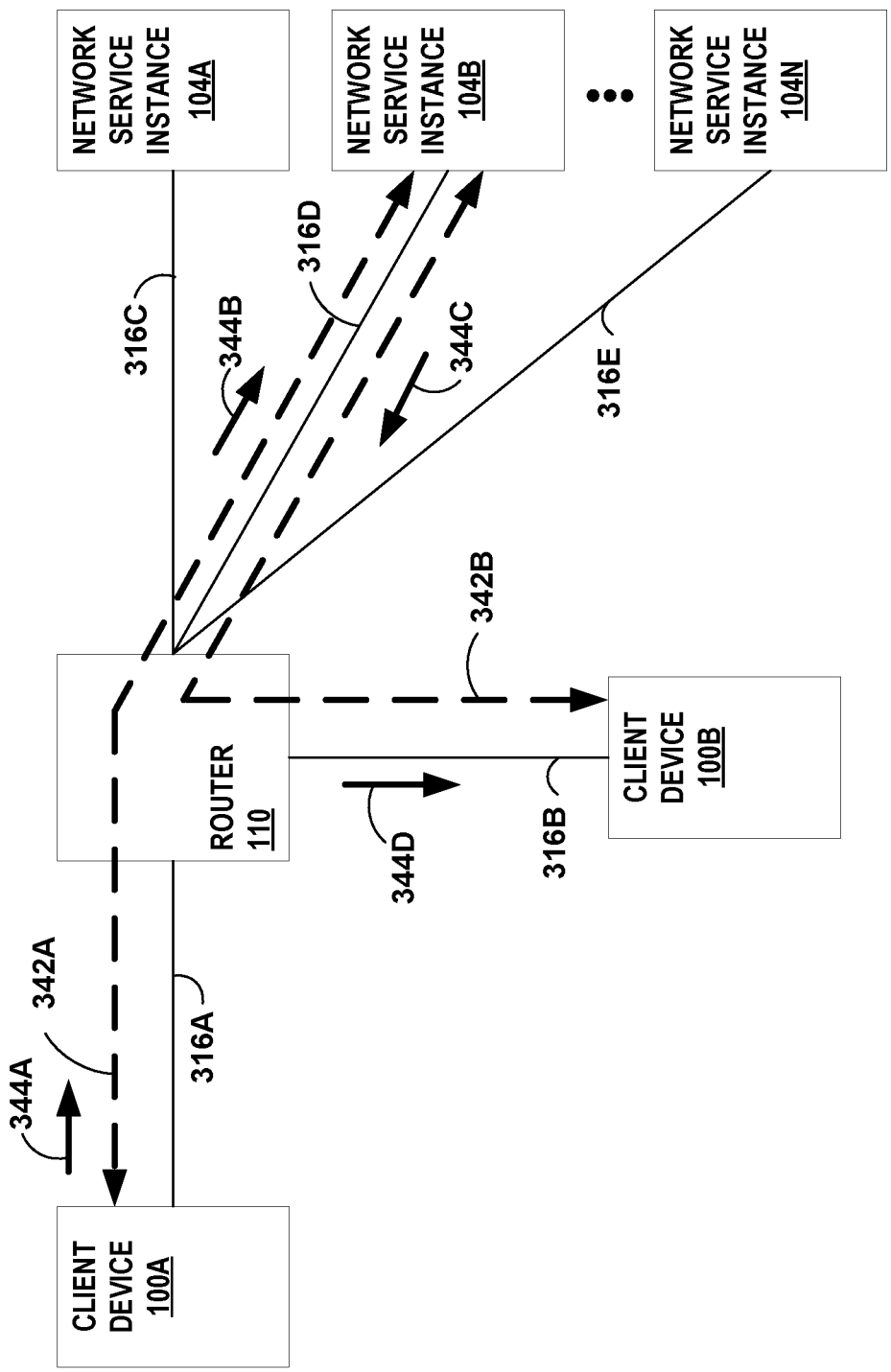
FIGS. 3A-3B are block diagrams illustrating the example computer network system of FIG. 1 in further detail.
Figure 3B:
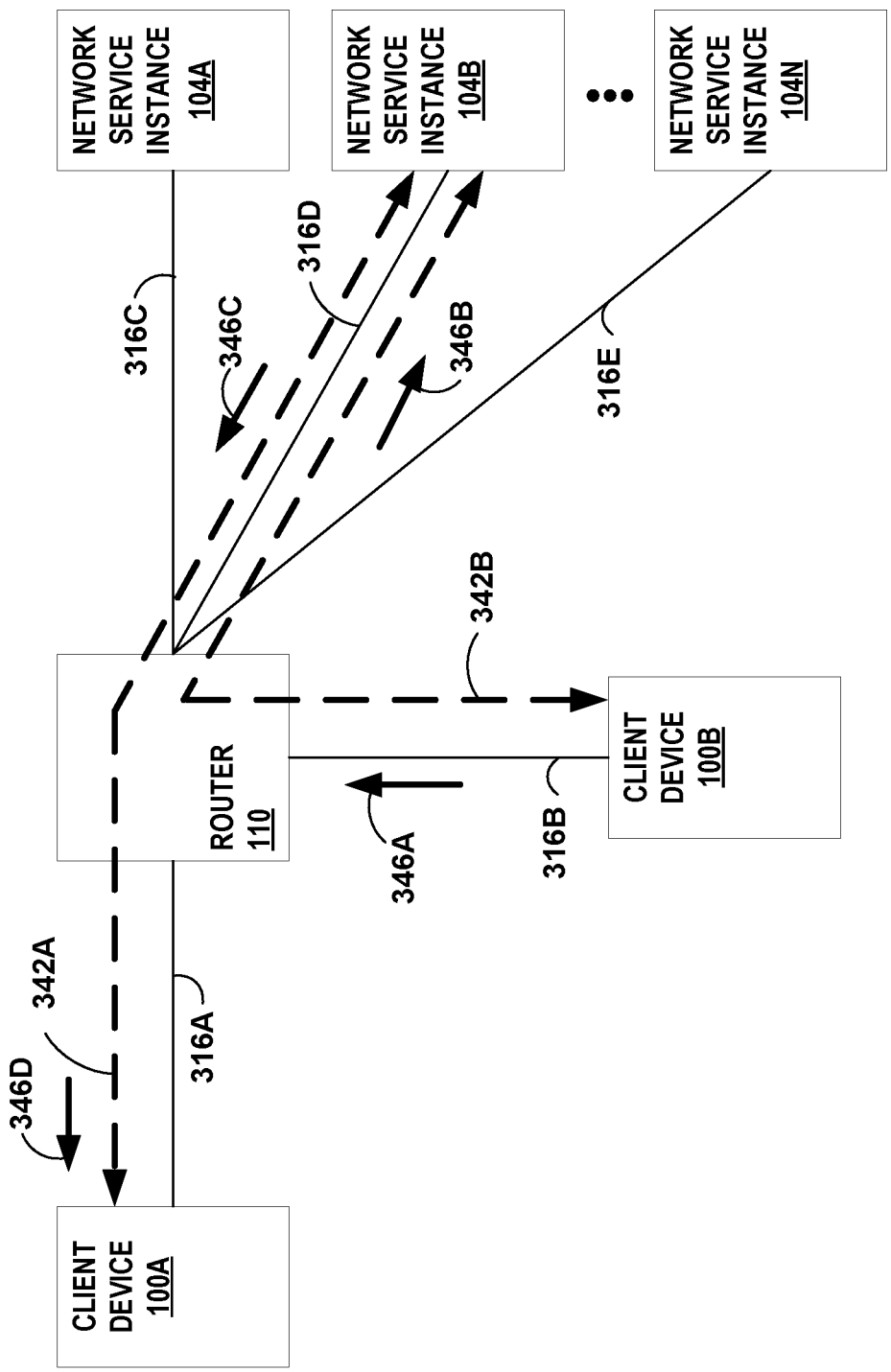

FIGS. 3A-3B are block diagrams illustrating example computer network system 2 of FIG. 1 in further detail. Client devices 100A and 100B, router 110, and network service instances 104 may FIGS. 3A-3B be similar to the like elements of FIG. 1. As depicted in the example of FIG. 3A, client devices 100A and 100B, router 110, and network service instances 104 are interconnected by links 316A-316E (collectively, "links 316"). In some examples, link 316A represents a Local Area Network (LAN) which provides interconnectivity between client device 100A and router 110. In some examples, link 316B represents a Wide Area Network (WAN) which provides interconnectivity between router 110 and client device 100B. In some examples, each network service 104 is not within a subnet of router 110 such that router 110 is unable to use an ARP request to obtain a MAC address of one or more network service instances 104.

Client device 100A (e.g., a source device) sends, to router 110, first packet 344A destined to client device 100B (e.g., a destination device). In some examples, packet 344A specifies a Layer-2 header comprising a source MAC address that is a MAC address of client device 100A and a destination MAC address that is a MAC address of router 110. Packet 344A further specifies a Layer-3 header comprising a source IP address and a source port that are an IP address and a port of client device 100A, respectively, and a destination IP address and a destination port that are an IP address and a port of client device 100B, respectively.

Router 110 receives packet 344A and selects network service instance 104A of a plurality of network service instances 104 with which to apply a network service to the first packet. In some examples, router 110 performs a load balancing operation to assign traffic of a session associated with packet 344 (e.g., first session 342) to network service instance 104A. Router 110 defines first session 342A associated with packet 344A. First session 342A comprises a forward packet flow and a reverse packet flow between client device 100A and selected network service instance 104A. In some examples, router 110 defines first session 342A based at least in part on a first interface identifier of a first interface of client device 100A from which router 110 receives packet 344A.

Router 110 modifies packet 344A to form packet 344B, which specifies a Layer-2 header comprising a source MAC address that is a MAC address of router 110 and a destination MAC address that is a MAC address of network service instance 104A. Router 110 forwards packet 344B to selected network service instance 104A for application of the network service to packet 344B.

Network service instance 104A applies the network service to packet 344B. Network service instance 104A modifies packet 344B to form packet 344C, which specifies a Layer-2 header comprising a source MAC address that is a MAC address of network service instance 104A and a destination MAC address that is the MAC address of router 110. Network service instance 104A forwards packet 344C to router 110.

Router 110 receives, from network service instance 104A, packet 344C after application of the network service to the packet by network service instance 104A. Router 110 defines second session 342B associated with packet 344C. Session 342B comprises a forward packet flow and a reverse packet flow between network service instance 104A and client device 100B. In some examples, router 110 defines second session 342B based at least in part on a second interface identifier of a second interface of network service interface 104A from which router 110 receives packet 344C.

Router 110 stores an association between second session 342B and the MAC address of network service instance 104A. Router 110 modifies packet 344C to form packet 344D, which specifies a Layer-2 header comprising a source MAC address that is a MAC address of router 110 and a destination MAC address that is a MAC address of client device 100B. Router 110 forwards packet 344D to client device 100B. Client device 100B receives, from router 110, packet 344D.

As depicted in the example of FIG. 3B, client device 100B subsequently sends, to router 110, second packet 346A destined to client device 100A. In some examples, packet 346A specifies a Layer-2 header comprising a source MAC address that is a MAC address of client device 100B and a destination MAC address that is a MAC address of router 110. Packet 346A further specifies a Layer-3 header comprising a source IP address and a source port that are an IP address and a port of client device 100B, respectively, and a destination IP address and a destination port that are an IP address and a port of client device 100A, respectively.

Router 110 receives packet 346A from client device 100B. Router 110 determines that packet 346A is associated with the reverse packet flow of second session 342B between network service instance 104A and client device 100B. Based on the stored association between second session 342B and the MAC address of network service instance 104A, router 110 modifies packet 346A to form packet 346B, which specifies a Layer-2 header comprising a source MAC address that is a MAC address of router 110 and a destination MAC address that is a MAC address of network service instance 104A, and forwards packet 346B to network service instance 104A.

Network service instance 104A applies the network service to packet 346B. Network service instance 104A modifies packet 346B to form packet 344C, which specifies a Layer-2 header comprising a source MAC address that is a MAC address of network service instance 104A and a destination MAC address that is the MAC address of router 110. Network service instance 104A forwards packet 346C to router 110.

Router 110 receives, from network service instance 104A, packet 346C after application of the network service to the packet by network service instance 104A. Router 110 determines that packet 346C is associated with the reverse packet flow of first session 342A between client device 100A and network service instance 104A. Router 110 modifies packet 346C to form packet 346D, which specifies a Layer-2 header comprising a source MAC address that is a MAC address of router 110 and a destination MAC address that is a MAC address of client device 100A. Router 110 forwards packet 346D to client device 100A. Client device 100A receives, from router 110, packet 346D.

Accordingly, using the techniques described above, router 110 may learn a MAC address of network service instance 104A from a first packet 344C serviced by network service instance 104A, and store an association between the MAC address of network service instance 104A and session 342B associated with a forward packet flow comprising first packet 344C. Upon receiving second packet 346A, router 110 may determine that second packet 346A belongs to a reverse packet flow of the same session 342B. In response to determining that second packet 346A belongs to the reverse packet flow of session 342B, router 110 may use the stored association between the MAC address of network service instance 104A and session 342B to forward packet 346A (depicted as packet 346B in FIG. 3B) to network service instance 104A for servicing. In this fashion, router 110 may implement service chaining while performing session-based routing.

Figure 4:
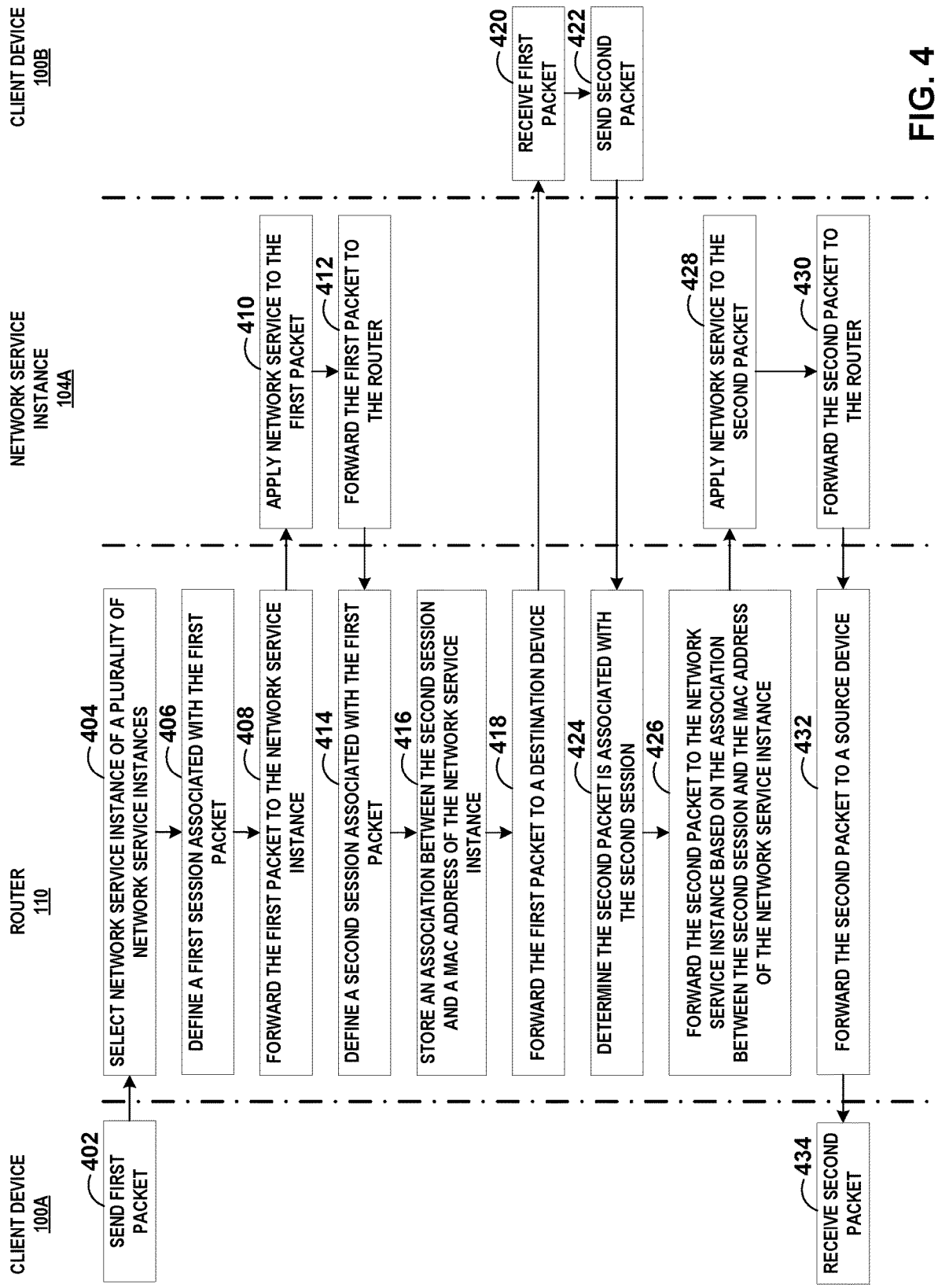
FIG. 4 is a flowchart illustrating an example operation in accordance with the techniques of the disclosure.

FIG. 4 is a flowchart illustrating an example operation in accordance with the techniques of the disclosure. FIG. 4 is described with respect to FIG. 3 for convenience.

As depicted in the example of FIG. 4, client device 100A (e.g., a source device) sends, to router 110, first packet 344A destined to client device 100B (e.g., a destination device) (402). In some examples, packet 344A specifies a Layer-2 header comprising a source MAC address that is a MAC address of client device 100A and a destination MAC address that is a MAC address of router 110. Packet 344A further specifies a Layer-3 header comprising a source IP address and a source port that are an IP address and a port of client device 100A, respectively, and a destination IP address and a destination port that are an IP address and a port of client device 100B, respectively.

Router 110 receives packet 344A and selects network service instance 104A of a plurality of network service instances 104 with which to apply a network service to the first packet (404). Router 110 defines first session 342A associated with packet 344A (406). First session 342A comprises a forward packet flow and a reverse packet flow between client device 100A and selected network service instance 104A. Router 110 modifies packet 344A to form packet 344B, which specifies a Layer-2 header comprising a source MAC address that is a MAC address of router 110 and a destination MAC address that is a MAC address of network service instance 104A. Router 110 forwards packet 344B to selected network service instance 104A for application of the network service to packet 344B (408).

Network service instance 104A applies the network service to packet 344B (410). Network service instance 104A modifies packet 344B to form packet 344C, which specifies a Layer-2 header comprising a source MAC address that is a MAC address of network service instance 104A and a destination MAC address that is the MAC address of router 110. Network service instance 104A forwards packet 344C to router 110 (412).

Router 110 receives, from network service instance 104A, packet 344C after application of the network service to the packet by network service instance 104A. Router 110 defines second session 342B associated with packet 344C. Session 342B comprises a forward packet flow and a reverse packet flow between network service instance 104A and client device 100B (414). Router 110 stores an association between second session 342B and the MAC address of network service instance 104A (416). Router 110 modifies packet 344C to form packet 344D, which specifies a Layer-2 header comprising a source MAC address that is a MAC address of router 110 and a destination MAC address that is a MAC address of client device 100B. Router 110 forwards packet 344D to client device 100B (418).

Client device 100B receives, from router 110, packet 344D (420). Subsequently, client device 100B sends, to router 110, second packet 346A destined to client device 100A (422). In some examples, packet 346A specifies a Layer-2 header comprising a source MAC address that is a MAC address of client device 100B and a destination MAC address that is a MAC address of router 110. Packet 346A further specifies a Layer-3 header comprising a source IP address and a source port that are an IP address and a port of client device 100B, respectively, and a destination IP address and a destination port that are an IP address and a port of client device 100A, respectively.

Router 110 receives packet 346A from client device 100B. Router 110 determines that packet 346A is associated with the reverse packet flow of second session 342B between network service instance 104A and client device 100B (424). Based on the stored association between second session 342B and the MAC address of network service instance 104A, router 110 modifies packet 346A to form packet 346B, which specifies a Layer-2 header comprising a source MAC address that is a MAC address of router 110 and a destination MAC address that is a MAC address of network service instance 104A, and forwards packet 346B to network service instance 104A (426).

Network service instance 104A applies the network service to packet 346B (428). Network service instance 104A modifies packet 346B to form packet 344C, which specifies a Layer-2 header comprising a source MAC address that is a MAC address of network service instance 104A and a destination MAC address that is the MAC address of router 110. Network service instance 104A forwards packet 346C to router 110 (430).

Router 110 receives, from network service instance 104A, packet 346C after application of the network service to the packet by network service instance 104A. Router 110 determines that packet 346C is associated with the reverse packet flow of first session 342A between client device 100A and network service instance 104A. Router 110 modifies packet 346C to form packet 346D, which specifies a Layer-2 header comprising a source MAC address that is a MAC address of router 110 and a destination MAC address that is a MAC address of client device 100A. Router 110 forwards packet 346D to client device 100A (432). Client device 100A receives, from router 110, packet 346D (434).

Accordingly, using the techniques described above, router 110 may learn a MAC address of network service instance 104A from a first packet 344C serviced by network service instance 104A, and store an association between the MAC address of network service instance 104A and session 342B associated with a forward packet flow comprising first packet 344C. Upon receiving second packet 346A, router 110 may determine that second packet 346A belongs to a reverse packet flow of the same session 342B. In response to determining that second packet 346A belongs to the reverse packet flow of session 342B, router 110 may use the stored association between the MAC address of network service instance 104A and session 342B to forward packet 346A (depicted as packet 346B in FIG. 3B) to network service instance 104A for servicing. In this fashion, router 110 may implement service chaining while performing session-based routing.

FIG. 5 is an illustration of example user interface 500 for a router operating in accordance with the techniques of the disclosure. In some examples, any of routers 110 as described above with respect to FIG. 1, 2, or 3A-3B may provide user interface 500 to enable a user or administrator to configure the router 110. As depicted in FIG. 5, user interface 500 provides toggle switch 502 to enable a user to enable or disable the functionality of a router 110 to use a source MAC address of a packet received from a device with an off-subnet source IP address to correlate reverse traffic to a session and enable the forwarding of such traffic to the off-subnet source IP address, as described herein.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
   receiving, by a network system, a first Layer-3 (L3) packet of a forward packet flow from a network service instance of a plurality of network service instances, the first L3 packet specifying a Media Access Control (MAC) address of the network service instance as a source MAC address, wherein the network system is within a first subnet and the plurality of network service instances are within a second subnet logically isolated from the first subnet;
   based on receiving the first L3 packet, defining, by the network system, a session entry for a session between a first client device and a second client device, the session entry specifying first address information for the first client device, second address information for the second client device, and the MAC address of the network service instance specified by the first L3 packet, wherein the session includes the forward packet flow and a reverse packet flow, the forward packet flow originating from the first client device and destined for the second client device and a reverse packet flow originating from the second client device and destined for the first client device;
   determining, by the network system, that a second L3 packet, received from the second client device and destined for the first client device, is associated with the reverse packet flow of the session;
   selecting, by the network system and based at least in part on the MAC address of the network service instance specified by the session entry for the session that includes the reverse packet flow with which the second L3 packet is determined to be associated, the network service instance from among the plurality of network service instances; and
   forwarding, by the network system, the second L3 packet to the selected network service instance using the MAC address of the selected network service instance.

2. The method of claim 1,
   wherein the second L3 packet does not include address information identifying the network service instance, and
   wherein the forwarding comprises forwarding the second L3 packet to the selected network service instance despite the second L3 packet not including address information identifying the network service instance.

3. The method of claim 1,
   wherein a first L3 header of the first L3 packet comprises a first source Internet Protocol (IP) address field that specifies an IP address of the first client device and a first destination IP address field that specifies an IP address of the second client device,
   wherein a first Layer-2 (L2) header of the first L3 packet comprises a first source MAC address field that specifies the MAC address of the network service instance and a first destination MAC address field that specifies a MAC address of the network system,
   wherein a second L3 header of the second L3 packet comprises a second source IP address field that specifies the IP address of the second client device and a second destination IP address field that specifies the IP address of the first client device, and
   wherein a second L2 header of the second L3 packet comprises a second source MAC address field that specifies a MAC address of the second client device and a second destination MAC address field that specifies the MAC address of the network system.

4. The method of claim 1,
   wherein the method further comprises, prior to application of the network service provided by the network service instance to the first L3 packet:
   receiving, by the network system and from the first client device, the first L3 packet;
   selecting, by the network system, the network service instance from among the plurality of network service instances; and
   forwarding, by the network system and to the selected network service instance, the first L3 packet for application of the network service provided by the network service instance, and
   wherein receiving the first L3 packet from the network service instance comprises receiving the first L3 packet from the network service instance after application of the network service provided by the network service instance.

5. The method of claim 1, further comprising, after application of the network service provided by the network service instance to the second L3 packet:

receiving, by the network system and from the network service instance, the second L3 packet; and forwarding, by the network system and to the first client device, the second L3 packet.

6. The method of claim 1, wherein the session entry comprises a session identifier for the session, a forward packet flow key for a forward packet flow of the session, a reverse packet flow key for a reverse packet flow of the session, and the MAC address of the network service instance.

7. The method of claim 6, wherein the session identifier is based at least in part on:
- the first address information for the first client device, the first address information for the first client device comprising a first Internet Protocol (IP) address of the first client device and a first port of the first client device;
- the second address information for the second client device, the second address information for the second client device comprising a second IP address of the second client device and a second port of the second client device;
- a network protocol of the first L3 packet;
- an interface identifier of an interface of the network service instance from which the network system receives the first L3 packet; and
- a Virtual Local Area Network (VLAN) identifier of the first L3 packet.

8. The method of claim 1,
wherein the session comprises a first session, and wherein the session entry comprises a first session entry for the first session,
wherein defining the first session entry comprises defining the first session entry comprising a first session identifier and the MAC address of the network service instance, wherein the first session identifier is based at least in part on a first interface identifier of a first interface of the network service instance from which the network system receives the first L3 packet,
wherein the method further comprises, prior to application of the network service provided by the network service instance to the first L3 packet:
receiving, by the network system and from the first client device, the first L3 packet; and
defining, by the network system, a second session entry for a second session, the second session entry comprising a second session identifier, wherein the second session includes the forward packet flow and the reverse packet flow, the forward packet flow originating from the first client device and destined for the second client device and the reverse packet flow originating from the second client device and destined for the first client device, and wherein the second session identifier is based at least in part on a second interface identifier of a second interface of the first client device from which the network system receives the first L3 packet.

9. The method of claim 1, wherein the plurality of network service instances comprises a plurality of firewall instances.

10. A network system comprising:
storage media; and
processing circuitry in communication with the storage media and configured to:
receive a first Layer-3 (L3) packet of a forward packet flow from a network service instance of a plurality of network service instances, the first L3 packet specifying a Media Access Control (MAC) address of the network service instance as a source MAC address, wherein the network system is within a first subnet and the plurality of network service instances are within a second subnet logically isolated from the first subnet;
based on receiving the first L3 packet, define a session entry for a session between a first client device and a second client device, the session entry specifying first address information for the first client device, second address information for the second client device, and the MAC address of the network service instance specified by the first L3 packet, wherein the session includes the forward packet flow and a reverse packet flow, the forward packet flow originating from the first client device and destined for the second client device and the reverse packet flow originating from the second client device and destined for the first client device;
determine that a second L3 packet, received from the second client device and destined for the first client device, is associated with the reverse packet flow of the session;
select, based at least in part on the MAC address of the network service instance specified by the session entry for the session that includes the reverse packet flow with which the second L3 packet is determined to be associated, the network service instance from among the plurality of network service instances; and
forward the second L3 packet to the selected network service instance using the MAC address of the selected network service instance.

11. The network system of claim 10,
wherein the second L3 packet does not include address information identifying the network service instance, and
wherein the processing circuitry is configured to forward the second L3 packet to the selected network service instance despite the second L3 packet not including address information identifying the network service instance.

12. The network system of claim 10,
wherein a first L3 header of the first L3 packet comprises a first source Internet Protocol (IP) address field that specifies an IP address of the first client device and a first destination IP address field that specifies an IP address of the second client device,
wherein a first Layer-2 (L2) header of the first L3 packet comprises a first source MAC address field that specifies the MAC address of the network service instance and a first destination MAC address field that specifies a MAC address of the network system,
wherein a second L3 header of the second L3 packet comprises a second source IP address field that specifies the IP address of the second client device and a second destination IP address field that specifies the IP address of the first client device, and
wherein a second L2 header of the second L3 packet comprises a second source MAC address field that specifies a MAC address of the second client device and a second destination MAC address field that specifies the MAC address of the network system.

13. The network system of claim 10,
wherein, prior to application of the network service provided by the network service instance to the first L3 packet, the processing circuitry is configured to:

receive, from the first client device, the first L3 packet;
select the network service instance from among the plurality of network service instances; and
forward, to the selected network service instance, the first L3 packet for application of the network service provided by the network service instance, and
wherein the processing circuitry is configured to receive the first L3 packet from the network service instance after application of the network service provided by the network service instance.

14. The network system of claim 10,
wherein, after application of the network service provided by the network service instance to the second L3 packet, the processing circuitry is configured to:
receive, from the network service instance, the second L3 packet; and
forward, to the first client device, the second L3 packet.

15. The network system of claim 10, wherein the session entry comprises a session identifier for the session, a forward packet flow key for a forward packet flow of the session, a reverse packet flow key for a reverse packet flow of the session, and the MAC address of the network service instance.

16. The network system of claim 15, wherein the session identifier is based at least in part on:
the first address information for the first client device, the first address information for the first client device comprising a first Internet Protocol (IP) address of the first client device and a first port of the first client device;
the second address information for the second client device, the second address information for the second client device comprising a second IP address of the second client device and a second port of the second client device;
a network protocol of the first L3 packet;
an interface identifier of an interface of the network service instance from which the network system receives the first L3 packet; and
a Virtual Local Area Network (VLAN) identifier of the first L3 packet.

17. The network system of claim 10,
wherein the session comprises a first session, and wherein the session entry comprises a first session entry for the first session,
wherein, to define the first session entry, the processing circuitry is configured to define the first session entry comprising a first session identifier and the MAC address of the network service instance, wherein the first session identifier is based at least in part on a first interface identifier of a first interface of the network service instance from which the network system receives the first L3 packet,
wherein, prior to application of the network service provided by the network service instance to the first L3 packet, the processing circuitry is further configured to:
receive, from the first client device, the first L3 packet; and
define a second session entry for a second session, the second session entry comprising a second session identifier, wherein the second session includes the forward packet flow and the reverse packet flow, the forward packet flow originating from the first client device and destined for the second client device and the reverse packet flow originating from the second client device and destined for the first client device, and wherein the second session identifier is based at least in part on a second interface identifier of a second interface of the first client device from which the network system receives the first L3 packet.

18. The network system of claim 10, wherein the plurality of network service instances comprise a plurality of firewall instances.

19. The network system of claim 10, wherein the plurality of network service instances comprises a plurality of deep packet inspection service instances.

20. Non-transitory, computer-readable media comprising instructions that, when executed, are configured to cause processing circuitry of a network system to:
receive a first Layer-3 (L3) packet of a forward packet flow from a network service instance of a plurality of network service instances, the first L3 packet specifying a Media Access Control (MAC) address of the network service instance as a source MAC address, wherein the network system is within a first subnet and the plurality of network service instances are within a second subnet logically isolated from the first subnet;
based on receiving the first L3 packet, define a session entry for a session between a first client device and a second client device, the session entry specifying first address information for the first client device, second address information for the second client device, and the MAC address of the network service instance specified by the first L3 packet, wherein the session includes the forward packet flow and a reverse packet flow, the forward packet flow originating from the first client device and destined for the second client device and a reverse packet flow originating from the second client device and destined for the first client device;
determine that a second L3 packet, received from the second client device and destined for the first client device, is associated with the reverse packet flow of the session;
select, based at least in part on the MAC address of the network service instance specified by the session entry for the session that includes the reverse packet flow with which the second L3 packet is determined to be associated, the network service instance from among the plurality of network service instances; and
forward the second L3 packet to the selected network service instance using the MAC address of the selected network service instance.

* * * * *